Sept. 5, 1967
H. HOEL
3,340,435
ELECTRICAL PROTECTIVE RELAY APPARATUS
Filed Feb. 10, 1965
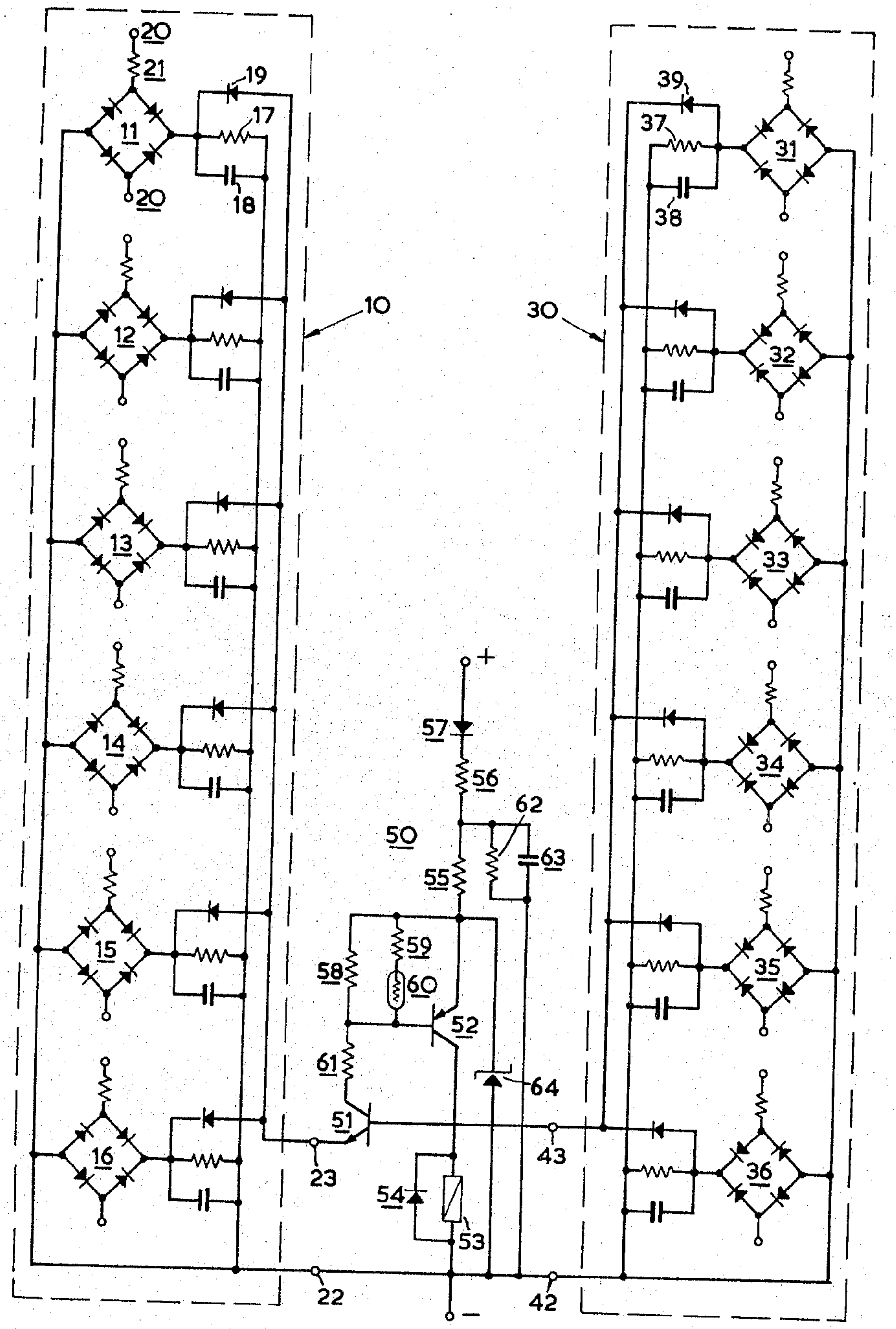

United States Patent Office 3,340,435

Patented Sept. 5, 1967

3,340,435

ELECTRICAL PROTECTIVE RELAY APPARATUS

Hans Hoel, Oslo, Norway, assignor to The English Electric Company Limited, London, England, a British company Filed Feb. 10, 1965, Ser. No. 431,643
Claims priority, application Great Britain, Feb. 13, 1964, 6,014/64
3 Claims. (Cl. 317—36)

ABSTRACT OF THE DISCLOSURE

This invention relates to a protective relay which comprises a single detecting element capable of producing an output signal in response to the occurrence of any phase-to-phase or any phase-to-earth faults in a three phase system within a predetermined distance from the relay. For effecting this function, the relay embodies an amplitude comparator for comparing the smallest of several voltages with the largest of several voltages, each representative of particular line conditions.

The invention relates to electrical apparatus.

According to the invention an electrical apparatus comprises a first detecting means responsive to a plurality of first input signals for producing at a pair of terminals a first electrical condition dependent on the largest of the first input signals, second detecting means responsive to a plurality of second input signals for producing a second electrical condition dependent on the smallest of the second input signals, and sensing means for sensing the first and second electrical conditions and for producing an output signal dependent on the relative value of the first electrical condition with respect to the second electrical condition.

According to a feature of the invention the said first detecting means includes a plurality of first input devices each responsive to a first input signal and arranged to produce a first intermediate signal having a magnitude dependent on the first input signal applied to that input device, a plurality of first unidirectional conducting devices each having one of its electrodes associated with an intermediate signal produced by a first input device with which it is associated and simultaneously having the other of its electrodes connected to an output terminal of the first detecting means so that the voltage developed at the said output terminal is substantially equal to the largest of the first intermediate signals, this voltage being the first electrical condition.

According to another feature of the invention the said second detecting means includes a plurality of second input devices each responsive to a second input signal and arranged to produce a second intermediate signal having a magnitude dependent on a second input signal applied to that input device, a plurality of second unidirectional conducting devices each having applied to one of its electrodes a second intermediate signal produced by a second input device with which it is associated and simultaneously having applied to the other of its electrodes a control voltage at an output terminal of the second detecting means, each unidirectional device being biased to a non-conducting condition when the second intermediate voltage is greater than the said control voltage and also being rendered conductive when the intermediate signal falls to a predetermined value below the said control voltage, the control voltage being generated by a source of high regulation so that when one of the unidirectional conducting devices is rendered conductive the control voltage falls and assumes a value dependent on the intermediate voltage associated with the unidirectional conducting device, and the control voltage being the said second electrical condition.

According to another feature of the invention the control voltage is applied through a variable impedance device which is controlled by the first reference condition so as to reduce to a low value the impedance of the variable impedance device whenever the first reference condition is less than the control voltage.

According to another feature of the invention an amplitude comparator distance relay includes such an aforesaid electrical apparatus in which each of the said first input signals represents a vector quantity of general form ($aV-IZ_1$), and each of the said second input signals represents a vector quantity of general form ($bV-IZ_2$), where V and I are respectively the voltages and currents in the system to be protected by the relay $Z_1$ and $Z_2$ are chosen replica impedance values and $a$ and $b$ are predetermined constants, $a$ and $b$ may have any value and $a$ or $b$ may be zero.

One electrical amplitude comparator distance relay according to the present invention will now be described by way of example and with reference to the accompanying drawing which shows diagrammatically the circuit of the relay.

Referring now to the drawing, a box 10 generally indicates six identical input devices comprising full-wave rectifier networks 11 to 16 each with an associated resistor, capacitor and diode 17, 18 and 19 respectively. Each input device is connected to input terminals 20 in series with a resistor 21. Each input device is connected with an output terminal 22 for connection to a negative terminal of an external source, and with an output terminal 23.

A box 30 generally indicates six identical input devices comprising full-wave rectifier networks 31 to 36 having components 37, 38 and 39 similar to those of the box 10 except that the diodes 39 associated with the rectifier networks are connected with an opposite polarity in the manner shown in the drawing. The box 30 has an output terminal 42 for connecting with the negative terminal of the external source and an output terminal 43 for connecting with the diodes 39.

Reference 50 generally indicates an amplifier connected between the negative and positive terminals of the external source and including a transistor 51 connected between output terminals 23 and 43. The collector circuit of a transistor 52 includes a relay 53 in parallel with a diode and is connected to the negative terminal of the external source. The emitter circuit of the transistor 52 comprises resistors 55 and 56 and diode 57 in series. A resistor 58 in parallel with a resistor 59 and a thermistor 60 is connected between the base and emitter of the transistor 52. A resistor 61 is connected between the collector of transistor 51 and the base of transistor 52.

The negative terminal of the external source is connected between resistors 55 and 56 by a resistor 62 in parallel with a capacitor 63 and is also connected to the emitter of the transistor 52 by a Zener diode 64.

The input signals to the various input devices are provided by a transformer arrangement (not shown in the drawing) which is energised in dependence on the currents I and voltages V in a three-phase electrical system to be protected by the relay.

In the box 10, each device 11–16 receives an input signal and develops an intermediate voltage in response thereto across its resistor 17. This intermediate voltage is smoothed by the action of the capacitor 18. A reference voltage is developed in effect across the terminals 22 and 23 by the amplifier arrangement, shown generally at 50, so that each diode 19 senses its associated intermediate voltage in respect to the reference voltage. In this way a current will flow in any of the diodes 19 where the intermediate voltage associated therewith is a predetermined amount less than the reference voltage.

The reference voltage is so arranged that whenever one or more of the intermediate voltages falls before the remainder of the intermediate voltage the reference voltage will also fall in dependence on the said one or more of the intermediate voltages. In this way only the diode associated with the said one or more voltages will remain in a conductive state. Thus the value of the reference voltage is dependent on the smallest of the input signals supplied to the input device 10. This input device is substantially as disclosed in my co-pending U.S. patent application Ser. No. 431,597.

The box 10 is arranged to receive six input signals from the transformer arrangement proportional to $(V-IZ)$ where Z is a suitable replica electrical impedance value these signals being dependent line or phase values of the electrical system. Appropriate turn ratios are arranged to step-up the phase values to provide substantially equal input signals to the box 10 under three-phase balanced conditions.

In a similar manner box 30 is arranged to receive six input signals from the transformer proportional to (IZ) these signals being similarly dependent respectively on line or phase values in the electrical system. Appropriate turn ratios are arranged to step-up the phase values to give substantially equal input signal values to box 30 under three-phase balanced conditions.

This amplitude comparator distance relay thus works on the combination of (VIZ) with (IZ) using the input devices and the amplifier shown in the drawing. That is, in this example $a1$, $b0$ and $Z_1$ $Z_2$ Z.

In operation a voltage, hereafter referred to as the first reference voltage appearing at terminals 42 and 43 and corresponding to the aforesaid first reference signals will be a voltage substantially equal to the largest of the voltages developed across resistors 37 and dependent on the largest of the input signals to the box 30.

The voltage, hereafter referred to as the second reference voltage, to be applied at the output terminals 22 and 23 and corresponding to the aforesaid second reference signal to render any of the diodes 19 conductive must exceed by a predetermined amount the smallest of the voltages developed across resistors 17 of the box 10; that is, this second reference voltage must have a value dependent on the smallest of the input signals to box 10. Hence the smallest of the voltages developed across the resistors 17 is regarded as the second reference voltage.

Under the aforesaid normal conditions the second reference voltage is greater than the first reference voltage so that the transistor 51 is held in a nonconductive state. Thus the voltage at the base and emitter of transistor 52 is the same and no current will flow through transistor 52 to the relay 53.

If the second reference voltage falls below the first reference voltage the transistor 51 will be rendered conductive thereby lowering the potential at the base of the transistor 52. Below a predetermined base-emitter potential the transistor 52 will allow a flow of current from the positive terminal of the external source to energise the relay 53 to produce a relay output signal. By choosing suitable component values of the amplifier, the operation of the relay may be arranged to depend on there being a voltage difference of a predetermined magnitude between the second reference signal and the first reference signal. Similarly, the said relay output signal may be arranged to have a magnitude dependent on the actual difference between the second reference signal and the first reference signal.

The amplifier always compares the largest input signal to box 30 with the smallest input signal to box 10 and is normally arranged so that the relay 53 operates as soon as the second reference signal is as great as the first reference signal.

The amplifier 50 may be replaced by any equivalent means which operates on the unbalance of the two reference signals as described above.

The invention is in no way limited to the amplitude comparator distance relay specified above, and is suitable for application to any system which produces a plurality of signals for comparison by a sensing means to produce an output signal whenever a greatest of some of those signals is larger than a certain value which is a value dependent on the smallest of the remainder of those signals. This output signal may have a magnitude dependent on the actual difference between the said greatest of some of those signals and the said certain value.

What I claim as my invention and desire to secure by Letters Patent is:

1. Protective relay apparatus for an electrical system comprising,
   - a plurality of first input circuits for developing signals proportional to first electrical conditions assumed by the protected system, each input circuit including
   - a first unidirectionally conducting device, and
   - first connecting means for connecting together like poles of each device in all said input circuits to a first terminal in a manner such that only the largest of said signals is developed at said terminal,
   - a plurality of second input circuits for developing signals proportional to second electrical conditions assumed by the protected system, each said second input circuit including
   - a second unidirectionally conducting device, and
   - second connecting means for connecting together like poles of each second device in all said second input circuits to a second terminal, and
   - switching means connected between said first and second terminals and operative to effect an alarm or control function, the polarity of said second unidirectionally conducting devices being such that said switching means is operative to effect said function in response to the signal at the first terminal exceeding by a predetermined amount the smallest signal developed by any of said second input circuits.

2. Protective relay apparatus according to claim 1, wherein said switching means comprises
   - a first electronic switch,
   - a relay connected in series with said first switch and
   - a regulated voltage source for supplying the switch and relay, and
   - a second electronic switch connected directly to said first and second terminals and operable to actuate the first electronic switch in response to the signal at the first terminal exceeding by a predetermined amount the said smallest signal developed by the second input circuit, whereby to energise the relay and effect said alarm or control function.

3. Protective relay apparatus according to claim 2, wherein said signals developed by the second input circuits represent a vector quantity of general form $aV-IZ_1$ and said signals developed by the first input circuits represent a vector quantity of the general form $bV-IZ_2$, where V and I are the voltages and currents, respectively, in the protected system, $Z_1$ and $Z_2$ are replica impedance values and *a* and *b* are predetermined constants, including zero.

References Cited

UNITED STATES PATENTS

| | | | |
|---|---|---|---|
| 2,608,606 | 8/1952 | Sonnemann | 317—27 |
| 3,001,100 | 9/1961 | Schuh et al. | 317—27 X |
| 3,037,151 | 5/1962 | Cimeran et al. | 317—27 |
| 3,108,205 | 10/1963 | Bancroft | 317—27 X |
| 3,160,788 | 12/1964 | Antoszenski et al. | 317—123.7 X |
| 3,167,685 | 1/1965 | Bade et al. | 317—123.7 X |

MILTON O. HIRSHFIELD, *Primary Examiner.*

R. V. LUPO, *Assistant Examiner.*